(12) United States Patent
Cacciato

(10) Patent No.: US 12,093,887 B2
(45) Date of Patent: Sep. 17, 2024

(54) RETURN OF ITEMS SEPARATED FROM OWNERS

(71) Applicant: Flippit Corp., New York, NY (US)

(72) Inventor: Richard L. Cacciato, New York, NY (US)

(73) Assignee: Flippit Corp., New York, NY (US)

( * ) Notice: Subject to any disclaimer, the term of this patent is extended or adjusted under 35 U.S.C. 154(b) by 75 days.

(21) Appl. No.: 17/576,571

(22) Filed: Jan. 14, 2022

(65) Prior Publication Data

US 2022/0138682 A1      May 5, 2022

Related U.S. Application Data

(63) Continuation-in-part of application No. 17/382,274, filed on Jul. 21, 2021.

(60) Provisional application No. 62/706,005, filed on Jul. 24, 2020.

(51) Int. Cl.
*G06Q 50/26* (2024.01)
*G06Q 10/083* (2023.01)
*G06Q 20/32* (2012.01)

(52) U.S. Cl.
CPC ..... *G06Q 10/0838* (2013.01); *G06Q 20/3276* (2013.01); *G06Q 50/265* (2013.01)

(58) Field of Classification Search
None
See application file for complete search history.

(56) References Cited

U.S. PATENT DOCUMENTS

| | | | |
|---|---|---|---|
| 5,656,799 A | 8/1997 | Ramsden | |
| 5,967,558 A * | 10/1999 | Petkovsek | B42D 5/02 462/65 |
| 6,793,136 B2 * | 9/2004 | Wells | G07B 17/00435 235/375 |

(Continued)

FOREIGN PATENT DOCUMENTS

WO    2022/018686    1/2022

OTHER PUBLICATIONS

PCT/IB2021/056647, International Search Report and Written Opinion (Nov. 17, 2021).

(Continued)

*Primary Examiner* — William J Jacob
(74) *Attorney, Agent, or Firm* — David E. Boundy; Potomac Law Group, PLLC (57) ABSTRACT

When a security screen at a security checkpoint identifies a forbidden item carried by a passenger, the passenger may be directed to a checkin station for a retrieval service. At the checkin station, passenger puts item into an envelope, and takes a physical receipt without delaying to enter delivery data. The physical receipt may be preprinted with an accessor code to a database that will give the passenger a tracking code and access to a database record to enter delivery and payment information. The accessor code may be a QR code, bar or machine vision code, an RFID tag that can be scanned by a sensor in a phone, a URL with a unique code to be typed, etc. Retrieval service may permit passenger to enter delivery data once the time constraint is relieved. Retrieval service may use a commercial delivery service such as UPS, FedEx, DHL, or a government Postal Service.

21 Claims, 9 Drawing Sheets

(56) References Cited

U.S. PATENT DOCUMENTS

| | | | |
|---|---|---|---|
| 6,917,924 B1* | 7/2005 | Ramsden | G01G 19/4148 |
| | | | 705/401 |
| 7,065,492 B2 | 6/2006 | Cinquini | |
| 7,647,231 B2 | 1/2010 | Kuebert | |
| 9,552,577 B2 | 1/2017 | DiTucci | |
| 2001/0042055 A1 | 11/2001 | Didriksen | |
| 2002/0007281 A1* | 1/2002 | Gil | G07B 17/00362 |
| | | | 705/407 |
| 2003/0191662 A1* | 10/2003 | Segrest | G06Q 10/083 |
| | | | 705/325 |
| 2003/0226883 A1 | 12/2003 | Liphard | |
| 2004/0010430 A1* | 1/2004 | Cinquini | G07B 17/00193 |
| | | | 705/13 |
| 2005/0065643 A1 | 3/2005 | Elefante | |
| 2005/0108111 A1 | 5/2005 | Kranyec | |
| 2009/0187271 A1* | 7/2009 | Heinlein | G06Q 10/08 |
| | | | 700/215 |
| 2010/0001862 A1 | 1/2010 | Wilson | |
| 2013/0284800 A1 | 10/2013 | Gillen | |
| 2018/0341914 A1 | 11/2018 | Levy | |
| 2020/0366674 A1* | 11/2020 | Gazdzinski | G07B 17/00314 |

OTHER PUBLICATIONS

Boomerang TSA, web site boomerangtsa.com, captured Mar. 10, 2020.

EP App. 21845740.6, Extended European Search Report (Jul. 19, 2024).

\* cited by examiner

FIG. 1

Data Preparation by Retrieval Service

Fig. 2A

Customer Interaction In Security Area

RETURN OF ITEMS SEPARATED FROM OWNERS

This application claims benefit, as a continuation-in-part (C-I-P) of U.S. application Ser. No. 17/382,274, filed Jul. 21, 2021, which is a non prov. of provisional of U.S. Provisional Application Ser. No. 62/706,005, filed Jul. 24, 2020, both titled Return of Items from Security Checkpoints. The entire disclosure of the parent applications are incorporated herein by reference.

BACKGROUND

This application relates to computerization to improve logistics of parcel delivery.

SUMMARY

In general, in a first aspect, the invention features a method, and a computer with instructions for performance of the method. A computer has a processor and a nontransitory memory. The memory has stored therein one or more programs. The programs cause the processor to generate a plurality of accessor codes, and to store individual generated accessor codes in corresponding records of a database. The programs cause the processor to instruct an output device to generate corresponding media each bearing one of the stored accessor codes, the generated media comprising two components frangibly joined, one component designed for permanent affixation to an empty envelope, the other component designed to be torn from the envelope and to be carried away from the security checkpoint by a passenger. The generating instructions direct the output device to generate the accessor code in computer-readable form on both the permanently affixed component and the component to be torn away. The programs cause the processor to receive one or more internet messages, the message content indicating that a customer seeks to initiate a parcel shipment, the message content indicating an envelope accessor code from an envelope, the envelope with its affixed accessor code having been prepositioned at a security checkpoint where forbidden items must be surrendered and having been prepared with the accessor code accessible via smartphone reader, the delivery initiation message having been triggered by a smartphone having accessed the accessor code of the envelope. The programs cause the processor to respond to receipt of the initiation message(s) by sending messages to request payment information and personal contact information from the smartphone. The programs cause the processor to prepopulate delivery address information of the database record of the received accessor code with address information associated with payment information received from the smartphone, and exchange messages with the smartphone to confirm or modify the delivery address information. The programs cause the processor to respond to receiving the payment and delivery address information, to send internet messages with content instructing retrieval of the envelope from the security checkpoint where the envelope was tendered by the customer. The programs cause the processor to respond to receiving the payment and delivery information, to send internet messages to a delivery shipper, content of the messages providing the payment and delivery information to the delivery shipper, to arrange shipment of the envelope by a delivery shipper and delivery to an address specified by the delivery information.

Embodiments of the invention may include one or more of the following features. These features may be used singly, or in combination with each other. The programs may cause the processor to send messages to the smartphone offering a plurality of payment gateways for selection by a user of the smartphone. The programs may cause the processor to send and receive messages to and from a computer embedded in a kiosk located at the security checkpoint, the messages from the kiosk providing one or more of the accessor code, personal contact information, payment information, and delivery address information. The programs may cause the processor to send messages to the kiosk's computer instructing the kiosk's computer to print a label at a printer located at the kiosk. The generated media may bear the stored accessor codes as printed QR codes. The generated media may bear the stored accessor codes as RFID tags.

The above advantages and features are of representative embodiments only, and are presented only to assist in understanding the invention. It should be understood that they are not to be considered limitations on the invention as defined by the claims. Additional features and advantages of embodiments of the invention will become apparent in the following description, from the drawings, and from the claims.

DESCRIPTION

The Description is organized as follows.
I. Overview
II. Database Structure
III. Operation
   III.A. Pre-processing: Pre-assigning Tracking Information, and Pre-stocking Kiosk 130 with Envelopes with Pre-affixed Tracking Information
   III.B. On-Demand Generation of Labels
   III.C. Customer Interaction in Security Area
   III.D. Customer Interaction After Security Area
   III.E. Order Processing
   III.F. To Check Order Status
   III.G. Shipper Handling
IV. Other uses
V. Computer Implementation

I. Overview

Figure 1:
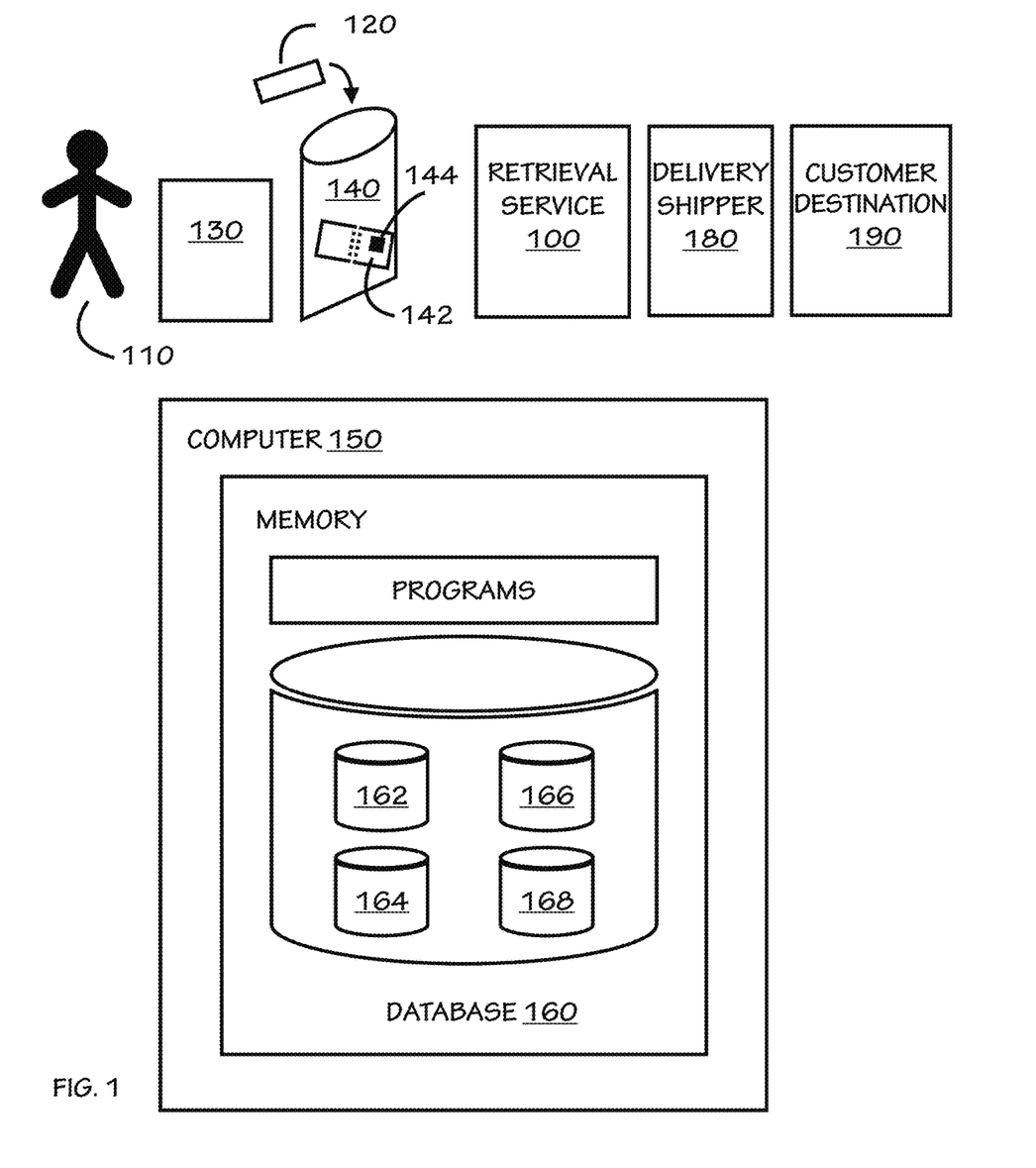
FIG. 1 is a block diagram of a computer system.

Each day, TSA (the Transportation Security Administration) and similar security services around the world confiscate thousands of prohibited items at airport security checkpoints. When a security screen at a security checkpoint identifies a forbidden item 120 carried by a passenger, the passenger may be directed to a retrieval service 100. Passenger 110 may submit item 120 for delivery by a delivery carrier 180 to a destination address 190 designated by passenger 110. At the checkin station 130 for retrieval service 100, passenger 110 puts item 120 into envelope 140, seals envelope 140, and takes physical receipt 142, without delaying to enter data. Passenger 110 may then leave the security area, thus avoiding creating bottlenecks or delays in the queue. Much of the preparatory work was done before the passenger arrived at the kiosk: the envelopes and tracking receipt have tracking information pre-affixed so that much of the task of parcel check-in can be deferred until the passenger is past the checkin point. Physical receipt 142 may be preprinted with accessor code 144 to database 160 that will give the passenger a tracking code and access to a database record to enter delivery and payment information after the passenger has left the time-constrained environment of the security checkpoint. For example, accessor code 144 may be a QR code that can be scanned by a smartphone, any other form of bar or machine vision code, an RFID tag that can be scanned by a sensor in a phone, a URL with a unique code to be typed, or other scannable code that connects to a specific order record of database 160. Once the accessor code is entered into a smartphone, the passenger may enter delivery address and payment information. Retrieval service 100 may permit passenger 110 to send item 120 from a security checkpoint or any other location past which certain items are not allowed and where there is a time constraint and the need to proceed without the delay associated with order entry, to a designated address for a fee, applying smartphone technology to make the process fast and painless. Retrieval service 100 may use a commercial delivery service 180 such as UPS®, FedEx®, DHL®, or a government delivery service such as the U.S. Postal Service or another national post office.

II. Database Structure

Database 160 for retrieval service 100 may include the following tables:

| Table Name | Data Included |
|---|---|
| QRgen 162 | used to generate order numbers and corresponding QR codes |
| orders 164 | contains order information about specific orders: customer, payment, pickup information, delivery address, tracking info, etc. |
| gateways 166 | stores information retrieval service 100 uses to access payment gateways |
| airports 168 | stores airport information |

Table QRgen 162

| Field | Type | Data Included |
|---|---|---|
| next order | | next available order number |
| next QR code | | next available QR code |
| recidq | text | record id of the QR code |
| timestamp | ts | Timestamp when the record is created |
| uuid | text | Unique id |
| url | calculated | url used to call up the website of retrieval service 100 and create the order in the database |
| qrcode | container | Image of a QR code generated from the url |
| printed | number | Set to 1 when the record has been printed |
| printdate | ts | Date when the record was printed |

Orders table 164 has one record for each item shipment. It tracks payment and delivery for that specific item.

Table Orders 164

| Field | Type | Data Included |
|---|---|---|
| ordernumber | text | an order number generated sequentially (with check digits) |
| QR code | | the QR code corresponding to the number |
| URL | | a URL to an order page |
| Origin | | an indication of the origin point-the airport, specific terminal and checkin line, etc. |
| ShippingAddr | | shipping address for the item to be mailed for this order number |
| contact | | contact information for the customer-email address, phone number |
| timestamp | ts | timestamp when the record is created |
| first | text | customer first name |
| last | text | customer last name |
| cellphone | text | customer cellphone number |
| email | text | customer email |
| address | text | customer address (where the item is to be shipped) |
| city | text | customer city (where the item is to be shipped) |
| zip | text | customer zip (where the item is to be shipped) |
| state | text | customer state (where the item is to be shipped) |
| emailvalidation | calculated | used to check that the email address is a valid email address |
| pmttime | ts | timestamp when the payment is made |
| amount | number | amount paid |
| confirmationsms | text | alphanumeric text used for confirmation text message sent to customer |
| confirmationemail | text | alphanumeric text used for confirmation email sent to customer |
| printedstatus | text | flag used to indicate that the shipping label for this order has been printed |
| pmtgateway | text | payment gateway the customer used to make the payment |
| pmttransactionID | text | transaction id of the payment |
| trackingno | text | tracking number from shipper |
| shipstatus | text | status: waiting in dropbox, collected, labeled and awaiting pickup by shipper, received by shipper and in transit, delivered |

Gateways table 166 includes information for each implemented payment provider—e.g., Apple Pay®, Google Pay®, Square®, Mastercard®, Visa®, Amex®, Discover®:

Table Gateways 166

| Fields | Type | Data Included |
|---|---|---|
| recidg | text | recid identifying the payment gateway in the database |
| gatewayname | text | name of the payment gateway |
| URL | text | url of the payment gateway |

Airports table may have one record for each airport, or perhaps one record for each security checkpoint at each airport.

Table Airports 168

| Fields | Type | Data Included |
|---|---|---|
| recida | text | record ID of the airport |
| airportcode | text | three letter airport code identifying the airport where the item was sent from |
| locationcode | text | alphanumeric code identifying the specific location (such as terminal or security checkpoint) where the item was sent from |

III. Operation

III.A. Pre-processing: Pre-assigning Tracking Information, and Pre-stocking Kiosk with Envelopes with Tracking Information Referring to FIG. 2A, in some cases, kiosk 130 may be very simple, with a bin for pre-stocked labels and envelopes, a delivery slot and a lockbox behind the delivery slot, but no electronics. Data from QRgen table 162 may be used to construct a series of unique alphanumeric ID numbers that will track an individual order, which may be stored on order table 164 of database 160 (step 202). These unique alphanumeric ID numbers may be stored in order table 164, with the URL of the order website, and other data such as (but not limited to) originating airport, terminal, location, date, etc. These data may be hashed together to form a unique URL (step 204) which may serve as a database key for orders table 164:
Sample URL:
orders.flippitback.com/A454JFK385X5423
This alphanumeric ID number is stored in the URL field of orders table 164.

Figure 2A:
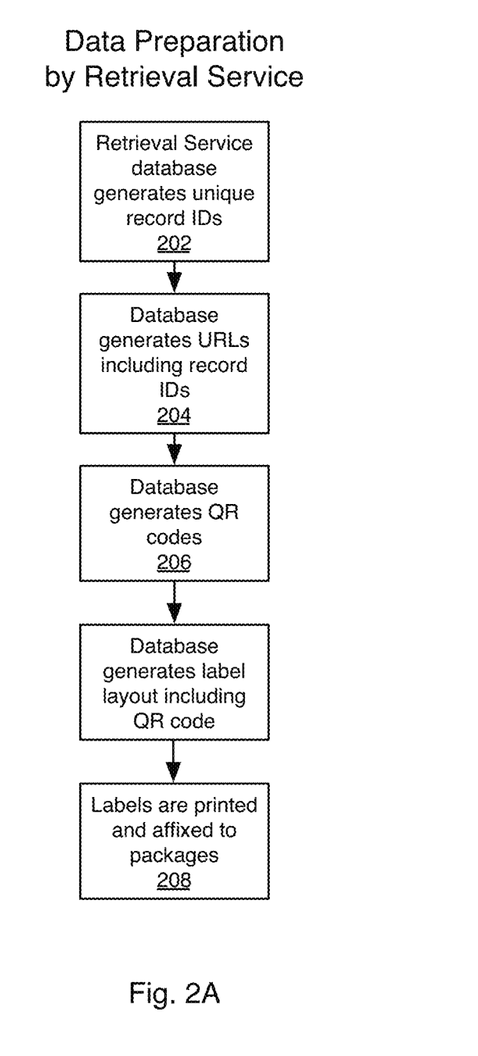
FIGS. 2A, 2B, 2C, 2D, 2E, and 2F are flowcharts.

Using the accessor code functionality of a third-party API such as Google's chart API, database 160 may generate unique accessor code 144, etc. from the URLs and store them in order table 164 (step 206).

Database 160 may serve the record data to the web front end which generates a page layout The record data may be used to batch print self-adhesive labels that each bear a unique accessor code 144 or a unique RFID tag, and/or a unique URL in a form that can be typed directly into a phone or computer manually (step 208).

In implementations using pre-processed labels and envelopes, these labels may be affixed to padded envelopes. Retrieval service 100 places the labeled envelopes 140 in kiosk 130 at airport security checkpoints or another dropoff point. Envelopes 140 may be provided to security officers or other personnel, so they can be handed to individual passengers 110 in the moment. In these cases, passenger 110 need not step out of line, and neither the passenger nor the TSA agent or other personnel need create significant disruption of checkin.

In some cases, as envelopes 140 are stocked into kiosk 130, a stocker person may scan accessor code 144 of envelopes 140 delivered to kiosk 130, to associate each accessor code (or range of accessor codes) with a pickup point. In other cases, the pickup point may be embedded in the accessor code. In some cases, kiosk 130 may be stocked with multiple sizes of envelopes, and the pre-processed labels stocked separately. A customer may drop item 120 into envelope 140, and affix label 142, 144, and tear off tear-away half 142.

III.B. On-Demand Generation of Labels

In other cases, label 142 and order may be created on the fly, on demand when a customer initiates an interaction. In these cases, a kiosk 130 may include:
- A display and touchscreen or other input device to allow a customer's data entry
- A supply bin for envelopes 140
- A scale for weighing envelope 140 and item 120
- A drop slot to receive envelopes 140

When a security screen identifies a forbidden item 120 carried by a passenger, the passenger may be directed to kiosk 130 to submit item 120 for delivery by a delivery carrier to an address designated by the passenger.

When a forbidden item 120 is identified, the passenger may be asked to step out of line and go over to kiosk 130. The passenger may approach kiosk 130 and touch a "begin" button. The passenger may request or may be given a shipping envelope 140 with accessor code 144 such as a scannable QR code or bar code, or an RFID device, or another technology that permits unique identification of envelope 140. In some cases, the label with its accessor code 144 may be printed in the moment via a printer at kiosk 130. The passenger may put item 120 in envelope 140 and seal it, and may tear off receipt 142, and may drop envelope 140 in the dropbox. The dropbox scans accessor code 144 and transmits accessor code 144 to database 160 which creates a record and marks it as pending. The passenger may then leave the security area and proceed to the gate.

The unique identifier of the envelope, accessor code 144, may be a QR code, or any other form of Matrix (2D) or linear bar or machine vision code that can be scanned by a smartphone. Examples include Code 39, Code 49, Code 93, Code 128, Aztec code, Han Xin Barcode, Data Matrix code, JAB Code, MaxiCode, PDF417 code, SPARQCode, and others. The unique identifier may be an RFID or similar tag that can be scanned by a sensor in a phone. The scan may be optical, or may use any IEEE 802 or related communications protocol, including Bluetooth, RFID (ISO 14443) or NFC (ISO 18092).

III.C. Customer Interaction in Security Area

Figure 2B:
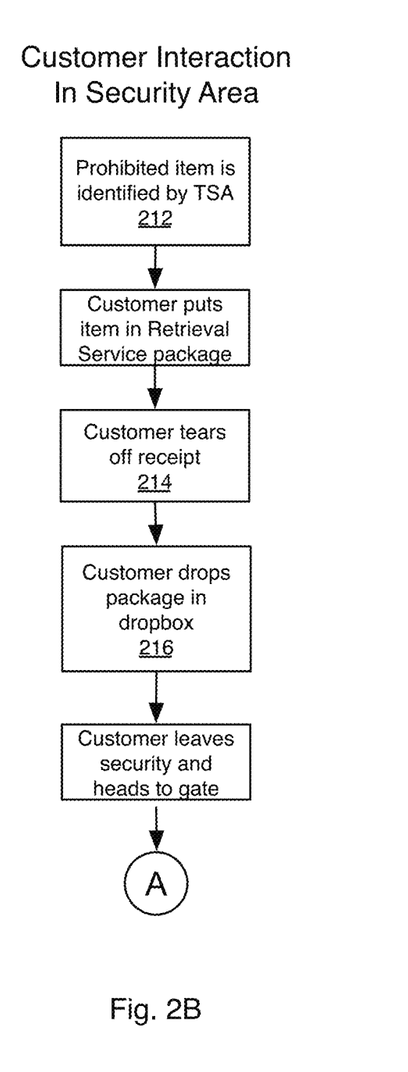
Figure 3A:
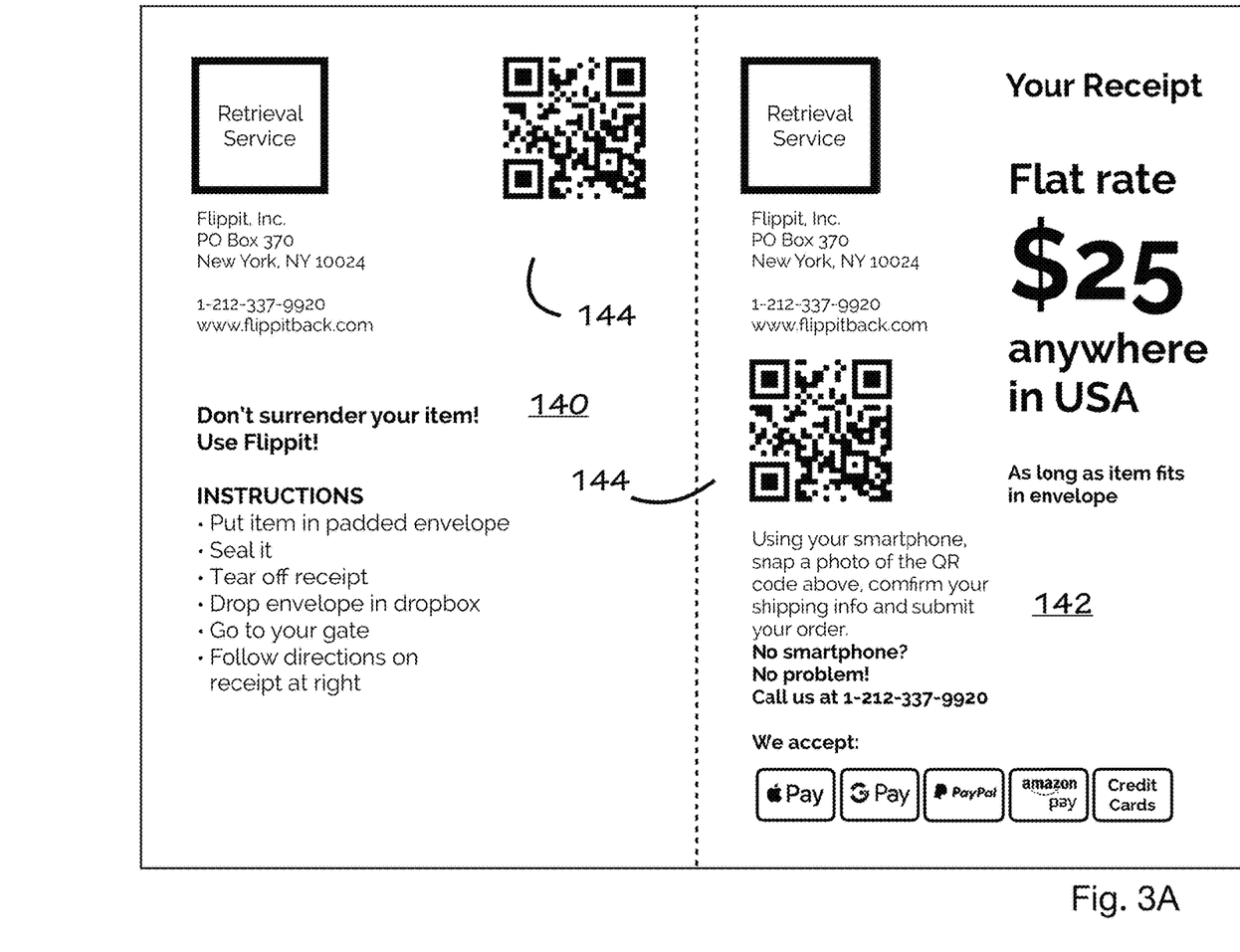
FIGS. 3A and 3B are diagrams of shipping labels.
Figure 3B:
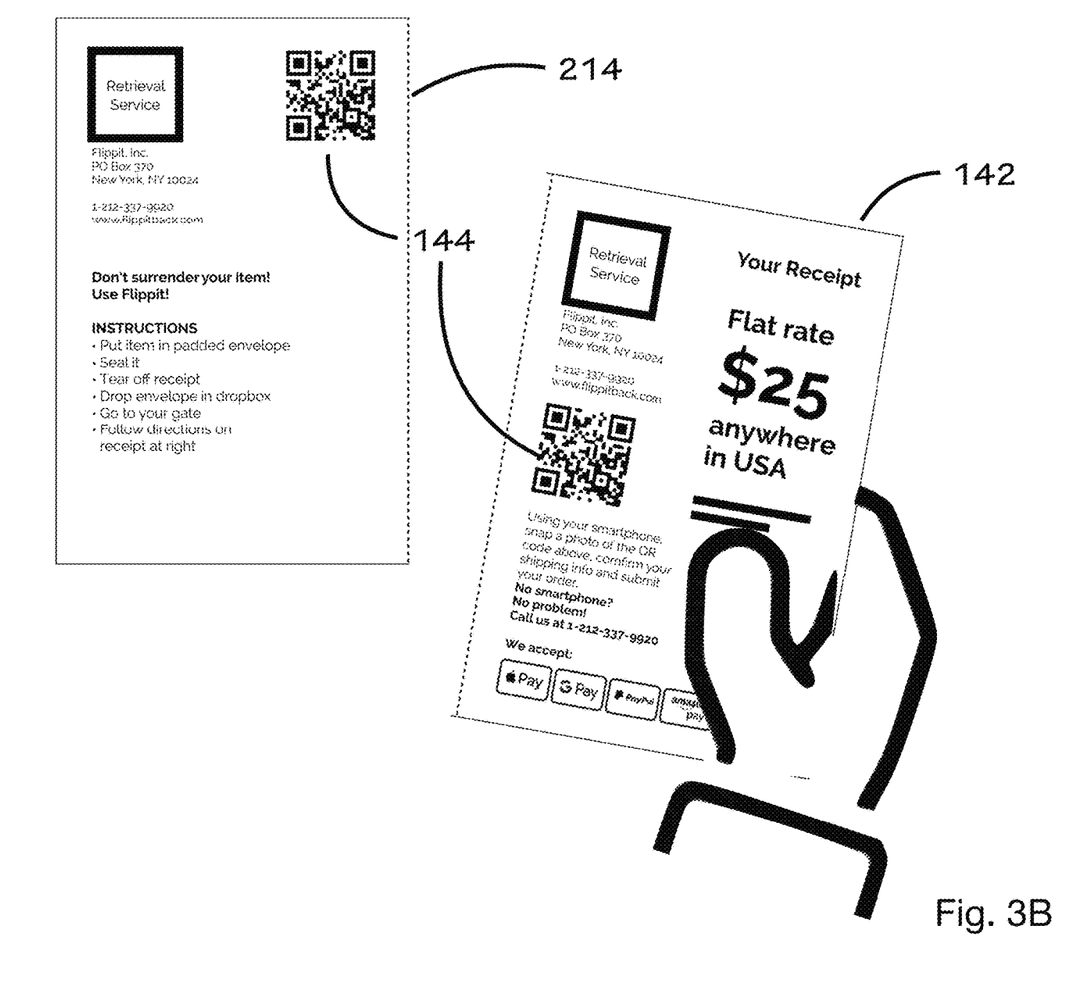

Referring to FIGS. 2B, 3A, and 3B, when a prohibited item 120 is found and a customer decides to use retrieval service 100 (step 212), customer 110 may be given pre-printed envelope 140, or may take an envelope from a bin or dispenser. In some cases, subject to TSA approval, retrieval service 100 may have an authorized agent such as an employee of retrieval service 100, or a third party contractor who is on-site in or near the security checkin area to assist passengers and TSA agents or to handle a variety of exception issues that arise from TSA inspection. Customer 110 may also be directed to leave the queue and go to a location with a kiosk or where an authorized agent such as an employee of retrieval service 100 or a third party contractor can assist.

Customer 110 may put item 120 in envelope 140. Factors limiting items 120 that can be shipped via retrieval service 100 may include:
- Retrieval service 100 may not ship items considered illegal such as guns, which are usually confiscated by TSA agents
- items have to fit into the padded envelope provided
- items 120 banned by the shipper: flammables, poisons, liquids in breakable bottles, controlled substances, aerosols, alcoholic beverages, tobacco products, cremated remains, perishables, and the like In cases where labels are pre-printed, the dropbox may be on the TSA agents' side of the security checkpoint. The passenger put item 120 in envelope 140 and may seal envelope 140, may tear off receipt 142 (step 214), and may deposit envelope 140 with item 120 inside in the dropbox, give it to the authorized agent of service 100, or surrender it to the TSA agent, before leaving the checkpoint. Passenger 110 may surrender (step 216) envelope 140 to the security agent, retrieval service employee, or third party agent who deposits envelope 140 into a designated dropbox for retrieval service 100, or the passenger 110 may deposit envelope 140 directly into a dropbox (step 216).

In cases where labels 140 are generated and printed on demand, passenger 110 may be asked to step out of line, retrieve all luggage and other goods from the checkpoint, and proceed to a divestiture or surrender station 130 at the entry to the checkpoint. There, the passenger may put item 120 in envelope 140 and drop it in the dropbox slot or give it to an authorized agent of service 100, then return to the security line. Passenger may also simply leave the security line and perform all steps with an agent of service 100 outside the security line.

Customer 110 may tear receipt 142 off envelope 140 (step 214).

Customer 110 may complete the security check and then leave the security area to proceed to the gate. At this point, the additional time burden on customer 110 and TSA agent may be small enough to avoid slowing the security screening line to process either item 120 or envelope 140.

In cases where an agent of retrieval service 100 handles envelope 140 (such as an employee or contractor of retrieval service 100), such agent may give the passenger 110 a pass that allows passenger 110 to return to the front of the security line, instead of the rear, or to use a third party accelerated security service to reduce or eliminate additional wait time.

III.D. Customer Interaction After Security Area

Figure 2C:
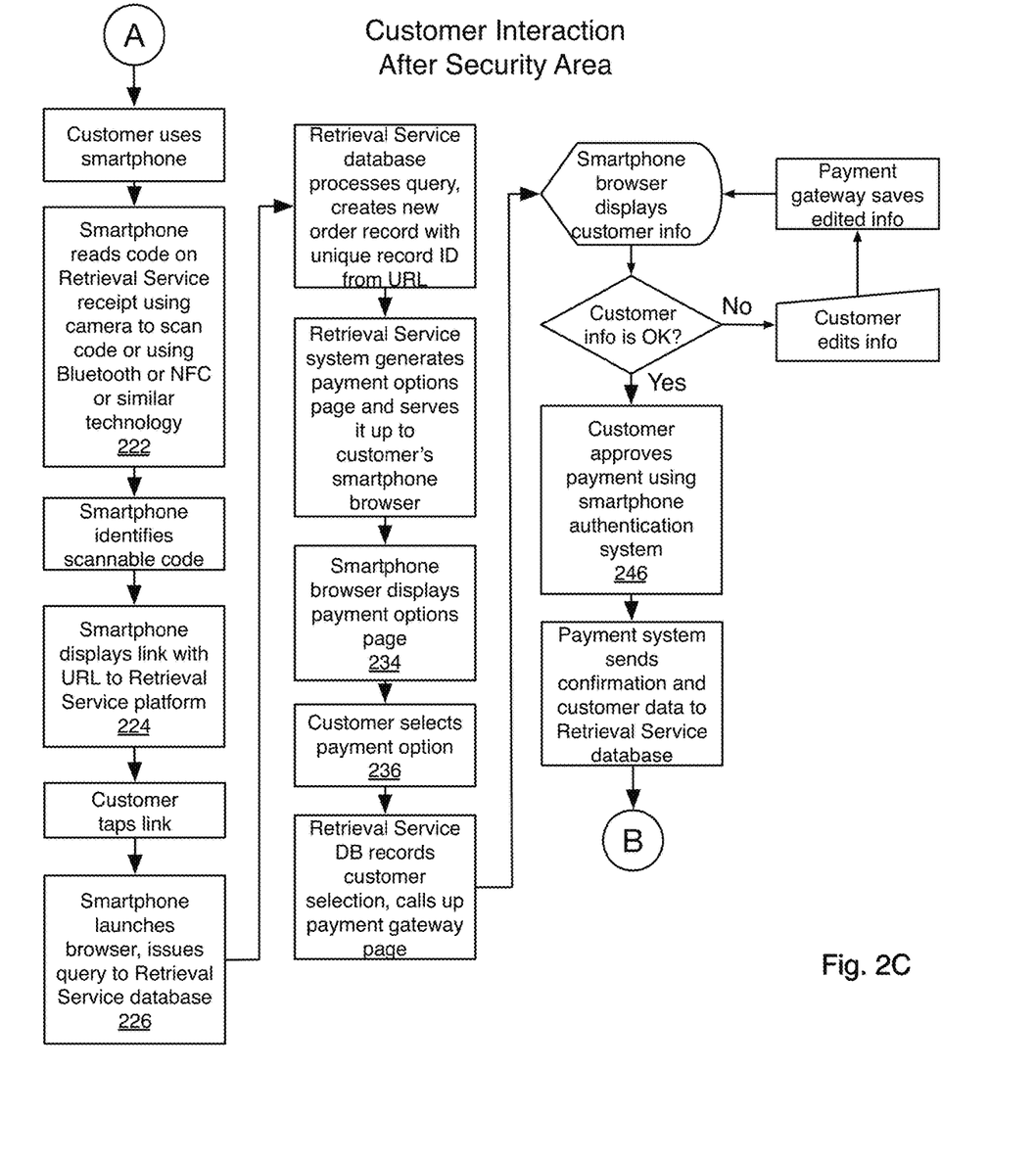

Referring to FIG. 2C, after customer 110 has cleared the security area, customer 110 may open a smartphone camera app. Customer 110 may point the smartphone camera at accessor code 144 on tear-off receipt 142. The smartphone camera app may identify (step 222) accessor code 144 and may display (step 224) a link to the unique URL of envelope 140 which references the URL generated in the QRgen table 162 of database 160.

Tearoff receipt 142 may also have a text URL and/or order number that can be typed into a browser.

When customer taps 110 the link, the smartphone may open a browser (step 226). The browser may query (step 228) database 160 and may post the unique code to database 160.

Database 160 creates (step 230) a new record in orders table 164 of database 160 with the unique ID embedded in the accessor code's URL. This record ID may become the order number (or may be translated to an order number via some mapping transform), which may be recorded in the order number field in orders table 164.

Figure 3C:
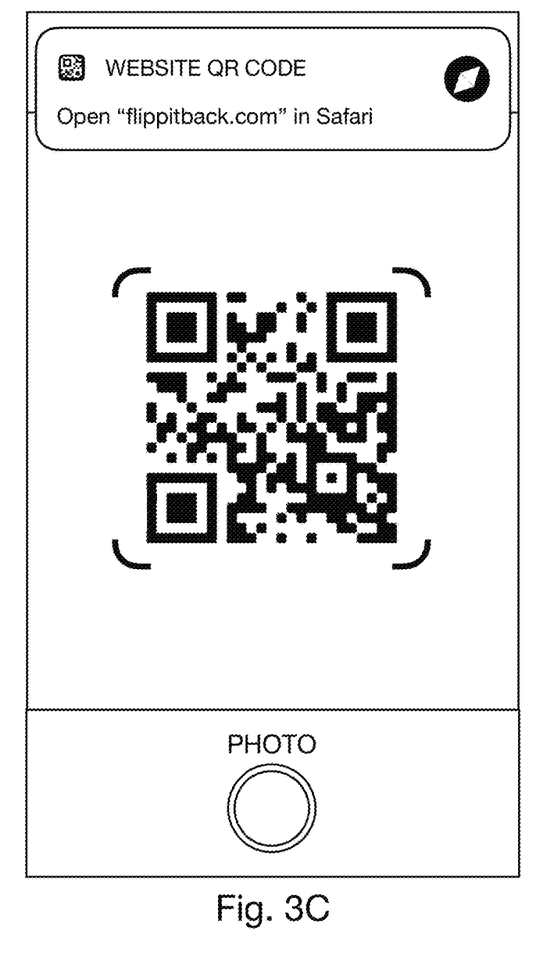
FIGS. 3C, 3D, 3E, and 3F are screen shots of a smartphone.
Figure 3D:
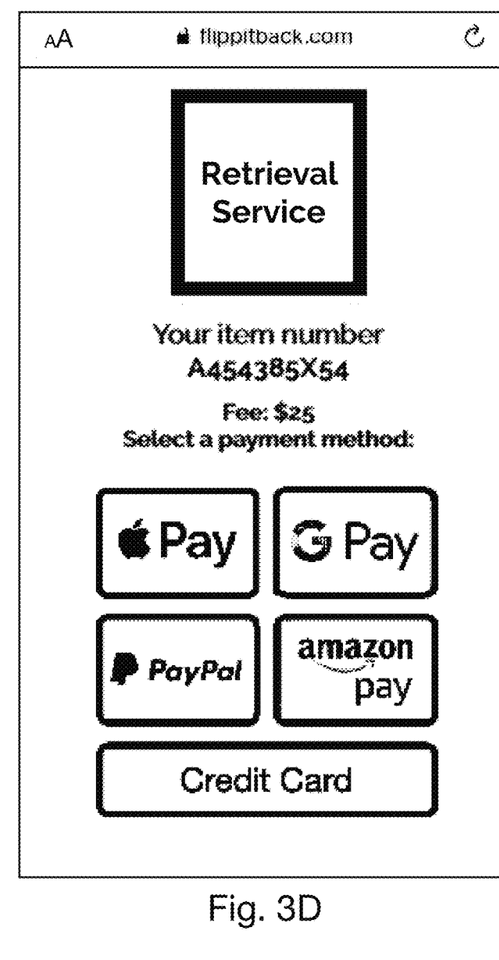

Referring to FIGS. 2C, 3C, and 3D, database 160 may then query gateways table 166. Database 160 may return the available payment gateways and payment gateway URLs to the webserver. The gateways may be the payment platforms used by retrieval service 100 to accept payment. These may include technology platforms such as Apple Pay, Google Pay, Paypal, and Amazon Pay which store customer and credit card information and authorize a payment to be charged to the passenger's credit card upon approval, as well as a payment processing platform such as Paypal or Square for accepting credit card information and authorizing payment.

Database 160 may return the available payment gateways and payment gateway URLs to the webserver, which in turn generates the payment page for display and sends the information to the customer's smartphone (step 234, FIG. 3D). In some cases, the payment page may show icons for the various payment gateways, and customer 110 may tap one of the icons to select a payment gateway.

The payment page, an HTML page which displays order information including item number, payment amount, and links to the available payment gateways stored in gateways table 166, is displayed in the customer's smartphone browser.

If customer 110 wishes to use a personal computer, or accessor code 144 does not lead to a gateway payment page, customer 110 may open a browser and type the URL shown on receipt 142, such as:

orders.flippitback.com/A454JFK385X5423

The webserver for retrieval service 100 may display a form, and in response, customer 110 may type the order number in a field on the form.

This URL may lead server computer 150 to the record of orders table 164 reflecting the customer's new order. Order table 164 receives data to fill in its fields from data entry by customer 110 at his/her personal computer.

The customer's smartphone or personal computer browser may display a payment page with the information described above. Each payment option may have a link to a predefined third-party payment gateway from gateways table 166. Customer 110 may use these links to select the payment gateway to use. This payment page may self-optimize for the user's device, whether that device is a mobile phone, tablet, or desktop computer.

Computer 100 may receive the customer's selection of a link on the payment page, which computer 100 may interpret as a payment option (step 236). The browser may connect to the payment gateway page.

The browser may display the payment screen of the payment gateway (step 242).

If customer 110 selects a payment gateway where customer 110 has an account, the payment gateway may display the following information:

| Information | Source |
| --- | --- |
| method of payment | Retrieved from the payment gateway |
| shipping address | |
| contact email | |
| amount to be paid | Retrieved from database 160 |

Figure 3E:
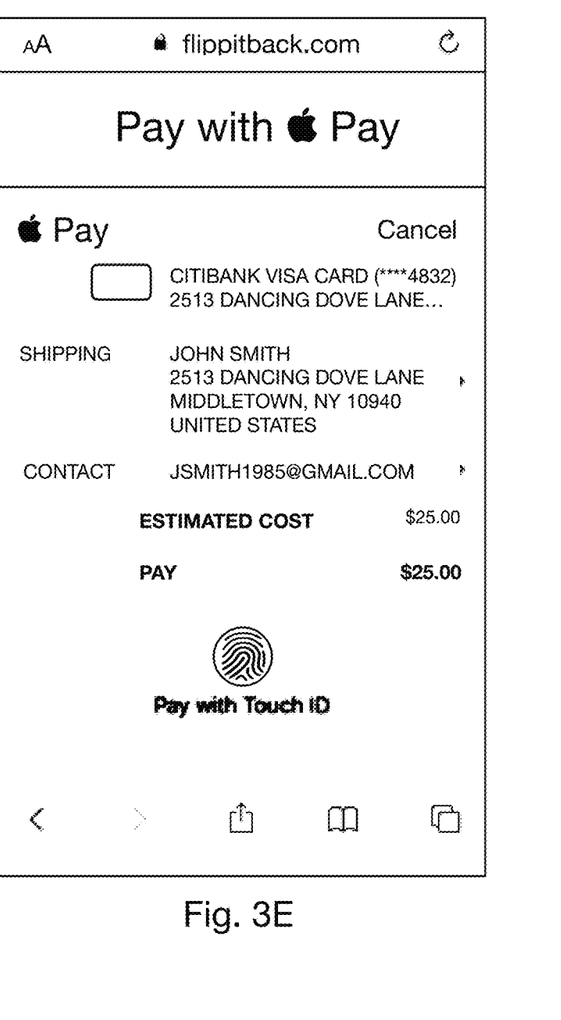

Referring to FIGS. 2C and 3E, the smartphone may display a shipping address and payment confirmation screen.

In some cases, the payment gateway may already have address information for customer 110. The web server may pre-seed the address field with the gateway's address, and may ask the user to review and confirm. Customer 110 may review the shipping address previously stored in the payment gateway. If customer 110 wishes to, customer 110 may change the shipping address in the payment gateway. The payment gateway may store the edited address.

If customer 110 selects "credit card", customer 110 may enter credit card information manually, or the smartphone may autofill this with information stored in the smartphone.

| Information | Source |
| --- | --- |
| first and last name shipping address contact email cellphone number credit card number credit card expiration date credit card security code | Autofilled by smartphone or entered manually by customer |
| amount to be paid | Retrieved from database 160 |

Figure 3F:
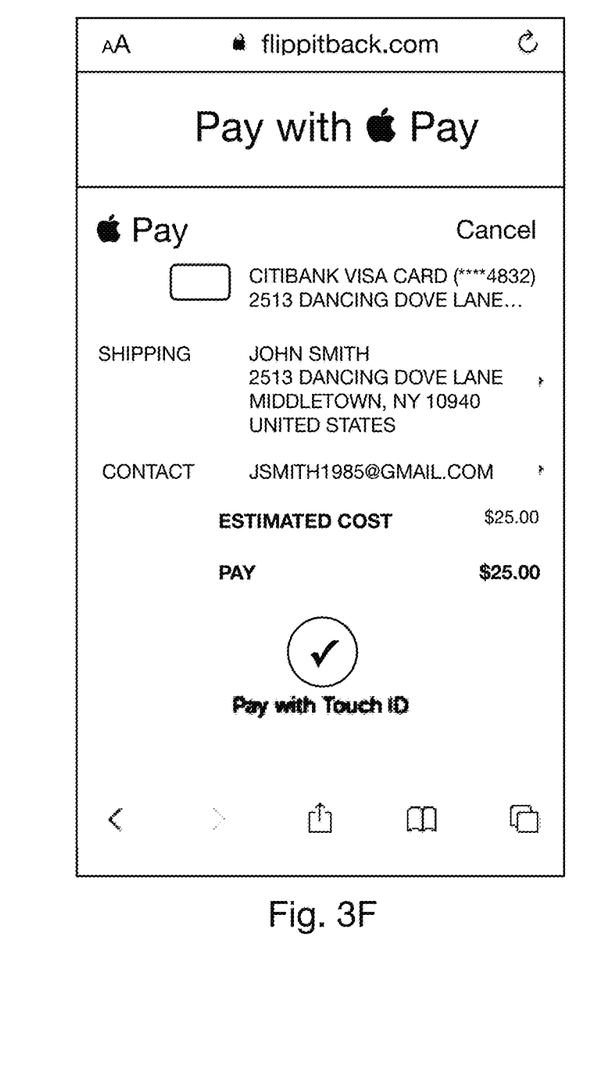

The smartphone's authentication system (including but not limited to TouchID or FaceID on iOS, fingerprint or facial recognition on Android, or password), may obtain payment confirmation and transaction approval from customer 110 (step 246). The transaction may be completed and the payment gateway may display payment confirmation in the smartphone browser (step 248, FIG. 3F).

If customer 110 uses a personal computer, the transaction may be completed in the computer's browser.

Figure 2D:
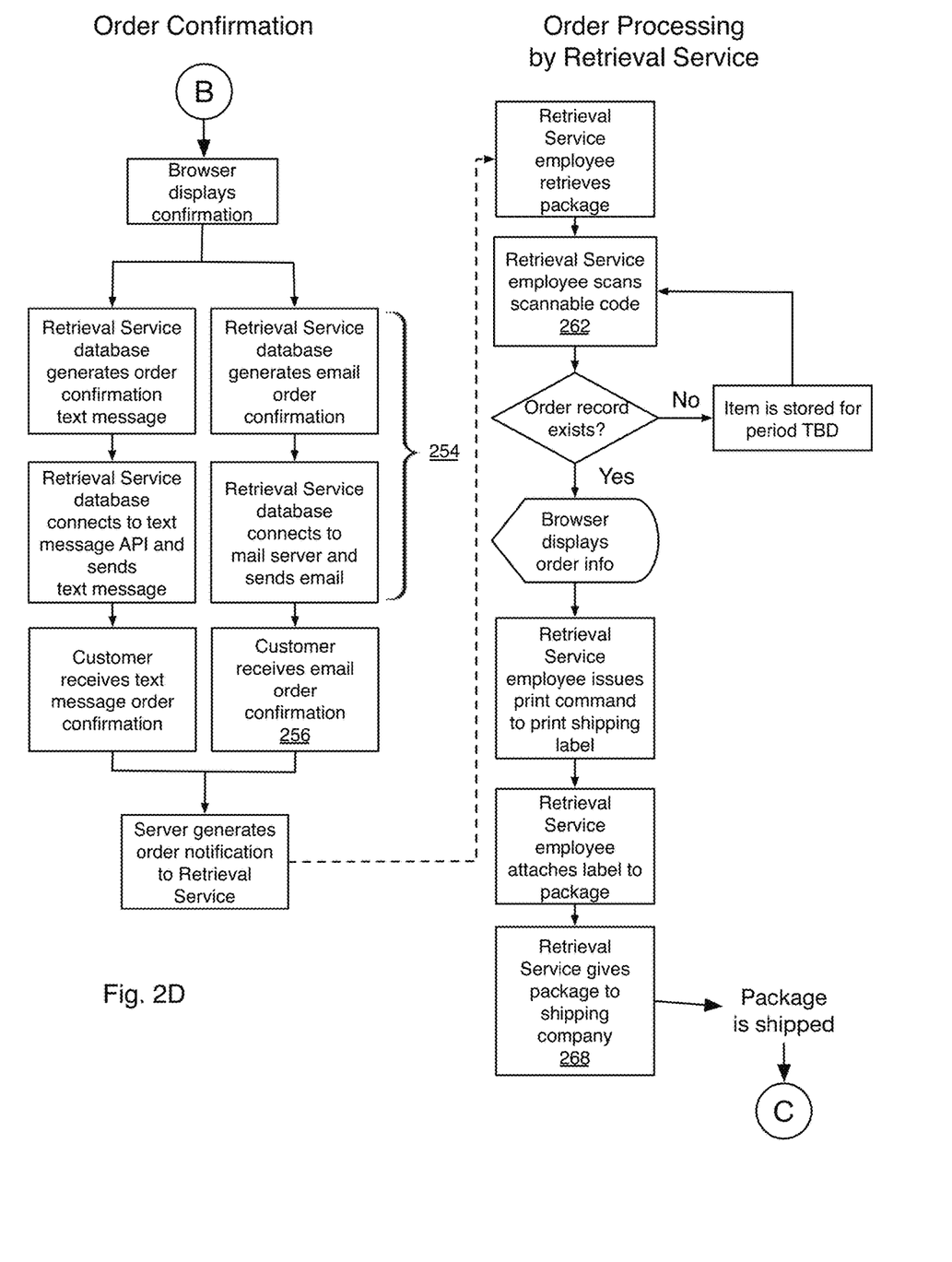

Referring to FIG. 2D, the payment system may return a confirmation of payment as well as customer data including customer's name, email address, cellphone number, and shipping address from the payment system.

Database 160 may record this customer information in orders table 164.

Database 160 may connect to the shipping company's system (UPS, FedEx, USPS, or a similar parcel carrier) via the carrier's API and send customer 110 information including customer's name, email address, cellphone number, and shipping address to the shipping company's system to generate a shipment.

The shipping company's system may generate a shipment with a tracking number and may return the tracking number to database 160. This shipment may be held as pending in the shipping company's system until retrieval service 100 prints the shipping label for its collections carrier, as will be discussed in section III.E below.

Database 160 may record the tracking number in orders table 164.

Database 160 may generate an alphanumeric string including the text for the confirmation text message which may be sent to the cellphone number provided by customer 110.

Database 160 may connect to a text messaging system and may cause a text message to be sent to the customer's cellphone number (step 254). The order confirmation may include:
  Order number
  Shipping Address
  Link with tracking number Computer system for retrieval service 100 may generate an alphanumeric string that includes the text for a confirmation email to be sent to customer 110.

Computer system for retrieval service 100 may likewise generate an order confirmation email and send it to the customer's email address (step 256). This confirmation email may include the order number for the retrieval service, shipping address, cell phone number, tracking number for the delivery/shipping company, a link to update or correct the shipping address (for a limited period of time), and a contact phone number and email address for the retrieval service 100.

III.E. Order Processing

An employee or agent of retrieval service 100 may periodically visit the dropboxes to collect envelopes 140 with items 120, to be returned to owners.

Once the employee has collected envelopes 140 and has returned to the office (or to a location with a label printer in it), the employee may log into an administrative backend in a computer browser and scans accessor code 144 of each envelope 140.

For each envelope 140 whose accessor code 144 is scanned, the browser may query database 160 and retrieve the record in orders table 164 associated with the unique QR code and its associated customer information (step 262). The order and shipping information may be displayed on the employee's computer screen.

The employee may verify that the information is complete and that there are no data errors, and may then issue a print command. Database 160 may connect to a database system at the shipper 180 (UPS, FedEx, or other) and may retrieve shipping label information. The browser may display the shipping label.

Once the employee has confirmed shipping instructions, computer system 150 may print the shipping label, and the employee may affix the printed label to envelope 140.

The shipstatus field in the record in database orders table 164 may be marked as printed and in process.

From this moment forward, accessing the URL via accessor code 144 as described in section III.D, above will retrieve order details as described in section III.F, below.

The employee may coordinate with the shipper for either delivery by the employee or pickup by the shipper (step 268).

III.F. To Check Order Status

Figure 2E:
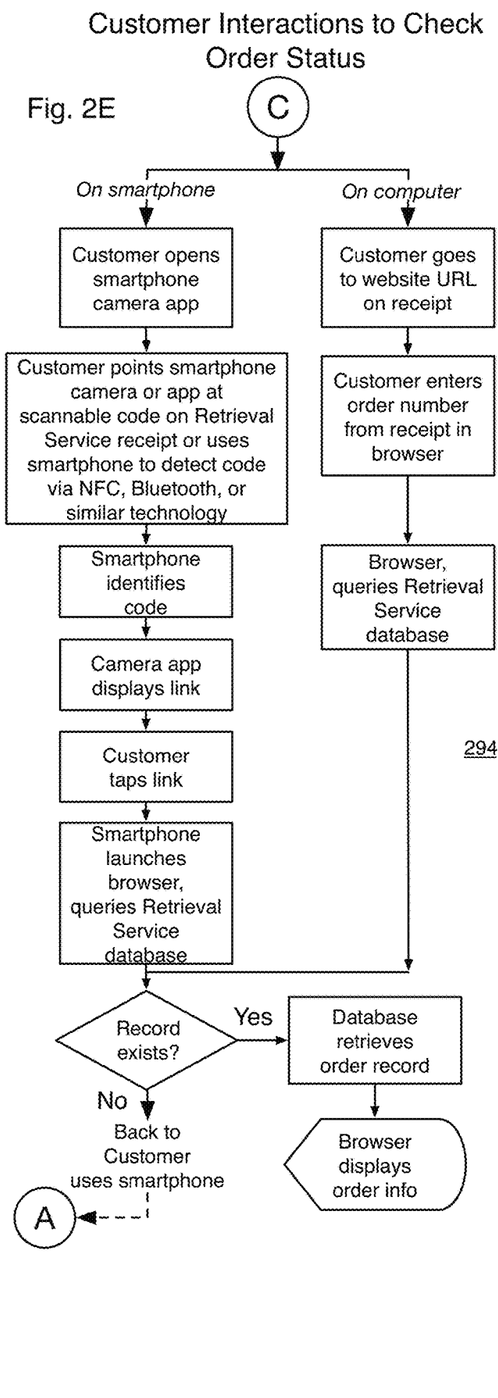

Referring to FIG. 2E, customer 110 can log into a computer for retrieval service 100 to check order status by clicking on the link in the text message or email confirmation.

Customer 110 can also access order information using a smartphone camera and by pointing it at accessor code 144 on receipt 142 as described in section III.D above. This may cause the smartphone to display the order information in a browser.

Customer 110 can also access order information from a personal computer by going to a website for retrieval service 100 and manually entering the order number from tearoff receipt 142.

In each of the cases listed in this section III.F, database 160 may query orders table 164 and return order and tracking information. The order information may be passed to the webserver and displayed in the customer's browser.

III.G. Shipper Handling

Any items for which no payment has been made (and thus no customer information or shipping address has been provided) may display as having pending payment status and no order record will be displayed. These items may be held for a predefined period of time (30 days, 60 days, TBD). When a held item's accessor code 144 is processed by a customer and a payment is made, creating an order, database 160 may generate a notification to notify retrieval service 100 that a held item is ready for processing and label printing. Unprocessed items may be held in a queue. Retrieval service 100 may dispose of any items for which the shipping fee is not paid after a specific time period.

When the order is tendered to the shipper, database 160 may generate a shipping status update message to customer 110. Database 160 may connect to a text messaging system and this text message may then be sent to the customer's cellphone number. Database 160 may connect to a mail server and an email may then be sent to the customer's email address. The text and email may have the shipper's tracking information, so customer 110 can track progress of the parcel.

Figure 2F:
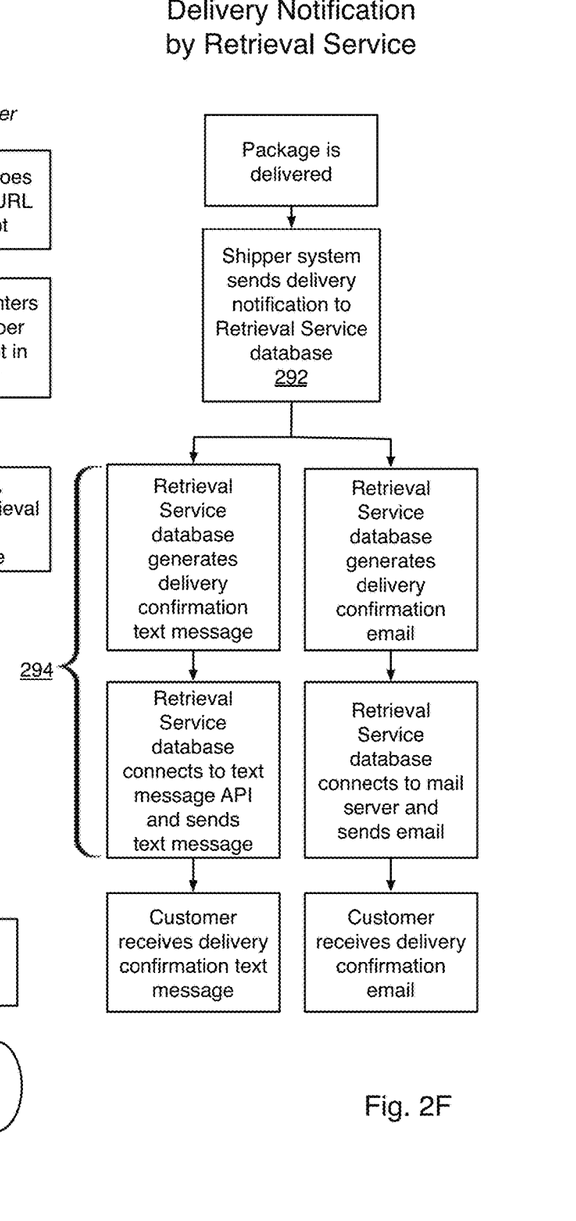

Referring to FIG. 2F, when the order is delivered (step 292), the shipper's computer may send (step 292) a confirmation to computer 150 of retrieval service 100. Database 160 may generate a delivery confirmation message to customer 110 (step 294). Database 160 may connect to a text messaging system and this text message may then be sent to the customer's cellphone number. Database 160 may connect to a mail server and an email will be sent to the customer's email address.

IV. Other Uses

The computer systems and labels may also apply to other processes in which a customer needs to deposit an item without stopping to perform a transaction or checkin, to avoid delay of processes or creation of a bottleneck. Examples may include security checkpoints at large venues like stadiums, sporting events, concerts, courthouses or public buildings, at baggage checkins, or laundry dropoffs.

V. Computer Implementation

Various processes described herein may be implemented by appropriately programmed general purpose computers, special purpose computers, and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in one or more computer programs, one or more scripts, or in other forms. The processing may be performed on one or more microprocessors, central processing units (CPUs), computing devices, microcontrollers, digital signal processors, or like devices or any combination thereof. Programs that implement the processing, and the data operated on, may be stored and transmitted using a variety of media. In some cases, hard-wired circuitry or custom hardware may be used in place of, or in combination with, some or all of the software instructions that can implement the processes. Algorithms other than those described may be used.

Programs and data may be stored in various media appropriate to the purpose, or a combination of heterogeneous media that may be read and/or written by a computer, a processor or a like device. The media may include non-volatile media, volatile media, optical or magnetic media, dynamic random access memory (DRAM), static ram, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge or other memory technologies. Transmission media include coaxial cables, copper wire and fiber optics, including the wires that comprise a system bus coupled to the processor.

Database 160 may be implemented using database management systems or ad hoc memory organization schemes. Alternative database structures to those described may be readily employed. Databases may be stored locally or remotely from a device which accesses data in such a database.

In some cases, the processing may be performed in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

A server computer or centralized authority may or may not be necessary or desirable. In various cases, the network may or may not include a central authority device. Various processing functions may be performed on a central authority server, one of several distributed servers, or other distributed devices.

VI. Embodiments

A computer has a processor and a nontransitory memory. The memory has stored therein one or more programs. The programs cause the processor to generate a plurality of accessor codes. The programs cause the processor to store individual generated accessor codes in corresponding records of a database. The programs cause the processor to instruct an output device to generate corresponding media each bearing one of the stored accessor codes. The generated media comprise two components frangibly joined, one component designed for permanent affixation to an empty envelope, the other component designed to be torn from the envelope and to be carried away from the security checkpoint by a passenger. The generating instructions direct the output device to generate the accessor code in computer-readable form on both the permanently affixed component and the component to be torn away. The programs cause the processor to receive one or more internet messages. The message content indicates that a customer seeks to initiate a parcel shipment. The message content indicates an envelope accessor code from an envelope. The envelope with its affixed accessor code has been prepositioned at a security checkpoint where forbidden items must be surrendered and has been prepared with the accessor code accessible via smartphone reader. The delivery initiation message has been triggered by a smartphone having accessed the accessor code of the envelope. The programs cause the processor to respond to receipt of the initiation message(s) by sending messages to request payment information and personal contact information from the smartphone. The programs cause the processor to prepopulate delivery address information of the database record of the received accessor code with address information associated with payment information received from the smartphone, and exchange messages with the smartphone to confirm or modify the delivery address information. The programs cause the processor to respond to receiving the payment and delivery address information, to send internet messages with content instructing retrieval of the envelope from the security checkpoint where the envelope was tendered by the customer. The programs cause the processor to respond to receiving the payment and delivery information, to send internet messages to a delivery shipper, content of the messages providing the payment and delivery information to the delivery shipper, to arrange shipment of the envelope by a delivery shipper and delivery to an address specified by the delivery information.

Embodiments of the invention may include one or more of the following features. These features may be used singly, or in combination with each other. The programs may cause the processor to send messages to the smartphone offering a plurality of payment gateways for selection by a user of the smartphone. The programs may cause the processor to send and receive messages to and from a computer embedded in a kiosk located at the security checkpoint, the messages from the kiosk providing one or more of the accessor code, personal contact information, payment information, and delivery address information. The programs may cause the processor to send messages to the kiosk's computer instructing the kiosk's computer to print a label at a printer located at the kiosk. The generated media may bear the stored accessor codes as printed matrix codes, linear code, QR codes, or as other printed 2D machine readable codes. The generated media may bear the stored accessor codes as RFID tags.

For clarity of explanation, the above description has focused on a representative sample of all possible embodiments, a sample that teaches the principles of the invention and conveys the best mode contemplated for carrying it out. The invention is not limited to the described embodiments. Well-known features may not have been described in detail to avoid unnecessarily obscuring the principles relevant to the claimed invention. Throughout this application and its associated file history, when the term "invention" is used, it refers to the entire collection of ideas and principles described; in contrast, the formal definition of the exclusive protected property right is set forth in the claims, which exclusively control. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. A list of items does not imply that any or all of the items are mutually exclusive, nor that any or all of the items are comprehensive of any category, unless expressly specified otherwise. In many cases, one feature or group of features may be used separately from the entire apparatus or methods described. Many of those undescribed alternatives, variations, modifications, and equivalents are within the literal scope of the following claims, and others are equivalent. The claims may be practiced without some or all of the specific details described in the specification. In many cases, method steps described in this specification can be performed in different orders than that presented in this specification, or in parallel rather than sequentially, or in different computers of a computer network, rather than all on a single computer.

The invention claimed is:

1. A method, comprising the steps of:

in a computer with a processor and nontransitory memory, generating a plurality of accessor codes, and storing individual generated accessor codes in corresponding records of a database;

in the computer, instructing an output device to generate corresponding media each to bear one of the stored accessor codes, the generated media comprising two components frangibly joined, one component designed for permanent affixation to shipping packaging, the other component designed to be torn away and to be carried away from the shipping packaging, the generating instructions programmed to direct the output device to generate the accessor code in computer-readable form on the component designed to be torn away;

in the computer, receiving one or more internet messages to initiate a parcel shipment, the media with its accessor code having been prepositioned at a location where articles of property are separated from their owners, the shipment initiation messages having been triggered by a smartphone based at least in part on the accessor code of the carried-away tear-off component after a person initiating the shipment has placed an article into shipping packaging not bearing a delivery address and is not in possession of the article or shipping packaging, the initiation messages' network addressing and/or content based at least in part on the accessor code of the carried-away tear-off component;

in response to receipt of the initiation message(s), and after the initiating person is no longer in possession of the article or shipping packaging, via the computer, exchanging messages with the smartphone to obtain payment information and delivery address information;

in response to receipt of the payment information and delivery address information, and after the initiating person is no longer in possession of the article or shipping packaging, sending internet messages with content instructing retrieval of the shipping packaging from the location where the shipping packaging was tendered by the initiating person; and in response to receipt of the payment information and delivery address information, sending internet messages to arrange shipment and delivery, content of the messages arranging payment, shipment and delivery of the shipping packaging and article to an address specified by the delivery address information.

2. The method of claim 1, further comprising the step of:

by a computer, after receiving the requested payment information, exchanging messages with the smartphone to automatically obtain from the smartphone delivery address information associated with payment information, prepopulating delivery address information for display to a user of the smartphone for confirmation of the obtained delivery address information, and exchanging messages with the smartphone to confirm or modify the delivery address information, and storing the payment information and confirmed or modified delivery address information in a database record.

3. A method, comprising the steps of:

by a computer, receiving one or more internet messages from a smartphone to initiate a parcel shipment, the initiation messages having been triggered by a smartphone of a person initiating the shipment based at least in part on a scan of an accessor code by the smartphone after the initiating person has placed an article into shipping packaging not bearing a delivery address and after the initiating person has left the point at which the initiating person has separated from possession of the shipping packaging and any article in the shipping packaging and is no longer in possession of the article and no longer in possession of the shipping packaging, addressing of the initiation messages and/or content of the initiation messages being based at least in part on the accessor code, the initiating person having left the separation point in possession of media with the accessor code, the media having been prepositioned at a separation point where articles are separated from persons in possession of the articles, the media being designed to be carried away from the separation point for access of the accessor code by a smartphone after the initiating person has left the separating point no longer in possession of the article and no longer in possession of the shipping packaging and the shipping packaging remaining unaddressed, the accessor code being in computer-readable form on the carried-away media, addressing of the initiation messages and/or content of the initiation messages indicating that the initiating person seeks to initiate a shipment of the shipping packaging after the initiating person has left the separation point no longer in possession of the article and no longer in possession of the shipping packaging;

in response to receipt of the initiation message(s), and after the initiating person is no longer in possession of the article and no longer in possession of the shipping packaging, by a computer, exchanging messages with the smartphone to obtain payment information and delivery address information, and storing the obtained payment information and delivery address information in a database record; and in response to receipt of the payment information and delivery address information, and after the initiating person has left the separation point no longer in possession of the article and no longer in possession of the shipping packaging, by computer, sending internet messages to arrange shipment and delivery, content of the messages designed to arrange payment, shipment and delivery of the shipping packaging and article to an address specified by the delivery address information in the database record.

4. The method of claim 3, further comprising the step of:
by a computer, after receiving the requested payment information, exchanging messages with the smartphone to automatically obtain from the smartphone delivery address information associated with payment information, prepopulating delivery address information for display to a user of the smartphone for confirmation of the obtained delivery address information, and exchanging messages with the smartphone to confirm or modify the delivery address information, and storing the payment information and confirmed or modified delivery address information in the database record.

5. The method of claim 3, further comprising the step of:
sending messages to the smartphone offering a plurality of payment gateways for selection by a user of the smartphone.

6. The method of claim 3, further comprising the step of:
generating an accessor code in computer-readable form on media designed for permanent affixation to the shipping packaging.

7. The method of claim 3, further comprising the step of:
generating an accessor code in computer-readable form on media designed to be frangibly affixed to the shipping packaging, the accessor code on a media component designed to be torn away and to be carried away from the shipping packaging.

8. The method of claim 3, wherein:
the separation point is a security checkpoint.

9. The method of claim 3, wherein:
the media bear the stored accessor codes as printed QR codes.

10. The method of claim 3, wherein:
the media bear the stored accessor codes as RFID tags.

11. The method of claim 3, further comprising the step of:
sending and receiving messages to and from a computer embedded in a kiosk located at the location, the messages from the kiosk providing one or more of the accessor code, personal contact information, payment information, and delivery address information.

12. The method of claim 11, further comprising the step of:
sending messages to the kiosk's computer instructing the kiosk's computer to print a label at a printer located at the kiosk.

13. A computer, comprising:
a processor;
a nontransitory memory having stored therein one or more programs programmed to cause the processor to:
generate media comprising two components frangibly joined, one component designed for permanent affixation to shipping packaging, the other component designed to be torn away and to be carried away from the shipping packaging, the generating instructions programmed to direct the output device to generate the accessor code in computer-readable form on the component designed to be torn away;
receive one or more internet messages from a smartphone to initiate a parcel shipment, the initiation messages having been triggered by a smartphone of a person initiating the shipment based at least in part on a scan of an accessor code by the smartphone after the initiating person has placed an article into shipping packaging not bearing a delivery address and after the initiating person has left the point at which the initiating person has separated from possession of the shipping packaging and any article in the shipping packaging and is no longer in possession of the article and no longer in possession of the shipping packaging, addressing of the initiation messages and/or content of the initiation messages being based at least in part on the accessor code, the initiating person having left the separation point in possession of media with the accessor code, the media having been prepositioned at a separation point where articles are separated from persons in possession of the articles, the media being designed to be carried away from the separation point for access of the accessor code by a smartphone after the initiating person has left the separating point no longer in possession of the article and no longer in possession of the shipping packaging and the shipping packaging remaining unaddressed, the accessor code being in computer-readable form on the carried-away media, addressing of the initiation messages and/or content of the initiating messages indicating that the initiating person seeks to initiate a shipment of the shipping packaging after the initiating person has left the separation point no longer in possession of the article and no longer in possession of the shipping packaging;

in response to receipt of the initiation message(s), and after the initiating person is no longer in possession of the article and no longer in possession of the shipping packaging, to exchange messages with the smartphone to obtain payment information and delivery address information, and storing the obtained payment information and delivery address information in a database record; and in response to receipt of the payment information and delivery address information, and after the initiating person has left the separation point no longer in possession of the article and no longer in possession of the shipping packaging, to send internet messages to arrange shipment and delivery, content of the messages designed to arrange payment, shipment and delivery of the shipping packaging and article to an address specified by the delivery address information of the database record.

14. The computer of claim 13, the programs being further programmed to:

by a computer, after receiving the requested payment information, exchanging messages with the smartphone to automatically obtain from the smartphone delivery address information associated with payment information, prepopulating delivery address information for display to a user of the smartphone for confirmation of the obtained delivery address information, and exchanging messages with the smartphone to confirm or modify the delivery address information, and storing the payment information and confirmed or modified delivery address information in the database record.

15. The computer of claim 13, the programs being further programmed to:

sending messages to the smartphone offering a plurality of payment gateways for selection by a user of the smartphone.

16. The computer of claim 13, the programs being further programmed to:

generating an accessor code in computer-readable form on media designed for permanent affixation to the shipping packaging.

17. The computer of claim 13, the programs being further programmed to:

generating an accessor code in computer-readable form on media designed to be frangibly affixed to the shipping packaging, the accessor code on a media component designed to be torn away and to be carried away from the shipping packaging.

18. The computer of claim 13, wherein:

the separation point is a security checkpoint.

19. The computer of claim 13, the programs being further programmed to:

send and receive messages to and from a computer embedded in a kiosk located at the location, the messages from the kiosk providing one or more of the accessor code, personal contact information, payment information, and delivery address information.

20. A method, comprising the steps of:

by a computer, receiving one or more internet messages from a smartphone to initiate a parcel shipment, the initiation messages having been triggered by a smartphone of a person initiating the shipment based at least in part on a scan of an accessor code by the smartphone after the initiating person has placed an article into shipping packaging not bearing a delivery address, addressing of the initiation messages and/or content of the initiation messages being based at least in part on the accessor code, the media having been prepositioned at a tender point where persons tender articles for shipment to a shipper, the media being designed to be carried away from the tender point for access of the accessor code by a smartphone, the accessor code being in computer-readable form on the carried-away media, addressing of the initiation messages and/or content of the initiation messages indicating that the initiating person seeks to initiate a shipment of the shipping packaging;

in response to receipt of the initiation message(s), by a computer, exchanging messages with the smartphone to obtain payment information;

by a computer, exchanging messages with the smartphone to automatically obtain from the smartphone delivery address information associated with payment information, prepopulating delivery address information for display to a user of the smartphone for confirmation of the obtained delivery address information, and exchanging messages with the smartphone to confirm or modify the delivery address information, and storing the payment information and confirmed or modified delivery address information in a database record;

in response to receipt of the payment information and confirmed or modified delivery address information, and after the initiating person has left the tender point, by computer, sending internet messages to arrange shipment and delivery, content of the messages designed to arrange payment, shipment and delivery of the shipping packaging and article to an address specified by the confirmed or modified delivery address information of the database record.

21. The method of claim 20:

the media being designed to be carried away from the separation point for access of the accessor code by a smartphone after the initiating person has left the tender point no longer in possession of the article and no longer in possession of the shipping packaging and the shipping packaging remaining unaddressed; and wherein the smartphone scan of the accessor code occurs after the initiating person has left the point at which the initiating person has separated from possession of the shipping packaging and any article in the shipping packaging and is no longer in possession of the article and no longer in possession of the shipping packaging, having left the separation point in possession of media with the accessor code.

\* \* \* \* \*